(12) United States Patent
Schalla

(10) Patent No.: US 7,814,638 B2
(45) Date of Patent: Oct. 19, 2010

(54) METHOD OF MANUFACTURE FOR REACTION-INJECTION-MOLDED CART

(75) Inventor: James P. Schalla, Seattle, WA (US)

(73) Assignee: The Boeing Company, Chicago, IL (US)

( * ) Notice: Subject to any disclaimer, the term of this patent is extended or adjusted under 35 U.S.C. 154(b) by 442 days.

(21) Appl. No.: 12/038,305

(22) Filed: Feb. 27, 2008

(65) Prior Publication Data

US 2008/0172855 A1 Jul. 24, 2008

Related U.S. Application Data

(62) Division of application No. 10/711,401, filed on Sep. 16, 2004, now abandoned.

(51) Int. Cl.
*B23P 11/00* (2006.01)
*B23P 25/00* (2006.01)
*B28B 5/00* (2006.01)
*B29C 45/00* (2006.01)

(52) U.S. Cl. .............. 29/458; 29/525.01; 29/527.1; 29/527.2; 280/47.34; 280/651; 264/241; 264/310; 264/299; 264/328.1

(58) Field of Classification Search ............ 29/458, 29/525.01, 527.1, 527.2, 897.2; 219/387; 280/33.998, 47.34, 47.36, 651, 79.11, 79.2, 280/79.3; 312/400; 264/241, 308, 309, 310, 264/312, 299, 328.1
See application file for complete search history.

(56) References Cited

U.S. PATENT DOCUMENTS

| 1,872,733 | A |   | 8/1932  | Greenwald |
|-----------|---|---|---------|-----------|
| 1,937,931 | A |   | 12/1933 | Wolters |
| 2,564,478 | A |   | 8/1951  | Harbison |
| 2,725,271 | A |   | 11/1955 | Cunningham |
| 3,091,946 | A |   | 6/1963  | Kesling |
| 3,128,007 | A |   | 4/1964  | Kops |
| 3,160,452 | A |   | 12/1964 | Rothman |
| 3,275,393 | A |   | 9/1966  | Conklin et al. |
| 3,311,434 | A |   | 3/1967  | Dyer et al. |
| 3,501,215 | A |   | 3/1970  | Gartner |
| 3,906,744 | A |   | 9/1975  | Knapp et al. |
| 4,043,721 | A | * | 8/1977  | Lemelson ............ 425/116 |
| 4,399,667 | A |   | 8/1983  | Lamb |
| 4,991,912 | A |   | 2/1991  | Fox |
| 5,142,835 | A |   | 9/1992  | Mrocca |
| 5,159,973 | A |   | 11/1992 | Pennington et al. |
| 5,316,701 | A | * | 5/1994  | Payne ................. 264/1.24 |
| 5,711,073 | A | * | 1/1998  | Tippmann et al. ...... 29/897.2 |
| 5,975,202 | A |   | 11/1999 | Grandi |

(Continued)

*Primary Examiner*—Jermie E Cozart
(74) *Attorney, Agent, or Firm*—Ostrager Chong Flaherty & Broitman P.C.

(57) ABSTRACT

One advantageous embodiment of the present invention is a reaction-injection-molded galley cart (10) for an aircraft. This cart (10) includes a body, which is configured to move along a passenger aisle of the aircraft. The body is comprised of a one-piece plastic shell (12) having a first side portion (28), a second side portion (30) spaced apart from the first side portion (28), a top side portion (24) extending between the first side portion (28) and the second side portion (30), and a bottom side portion (32) extending between the first side portion (28) and the second side portion (30). This one-piece plastic shell (12) includes at least one layer (36) of a reaction-injection-molded material.

14 Claims, 4 Drawing Sheets

U.S. PATENT DOCUMENTS

| | | |
|---|---|---|
| 6,214,272 B1 * | 4/2001 | Gruenwald et al. ......... 264/255 |
| 7,025,121 B2 | 4/2006 | Whitehead et al. |
| 2001/0009347 A1 | 7/2001 | Kasuya |
| 2002/0024272 A1 | 2/2002 | Eschenfelder |
| 2002/0153817 A1 | 10/2002 | Wenning et al. |
| 2005/0218615 A1 | 10/2005 | Hu |

* cited by examiner

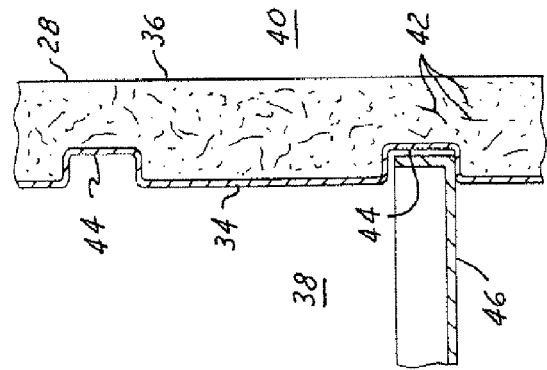
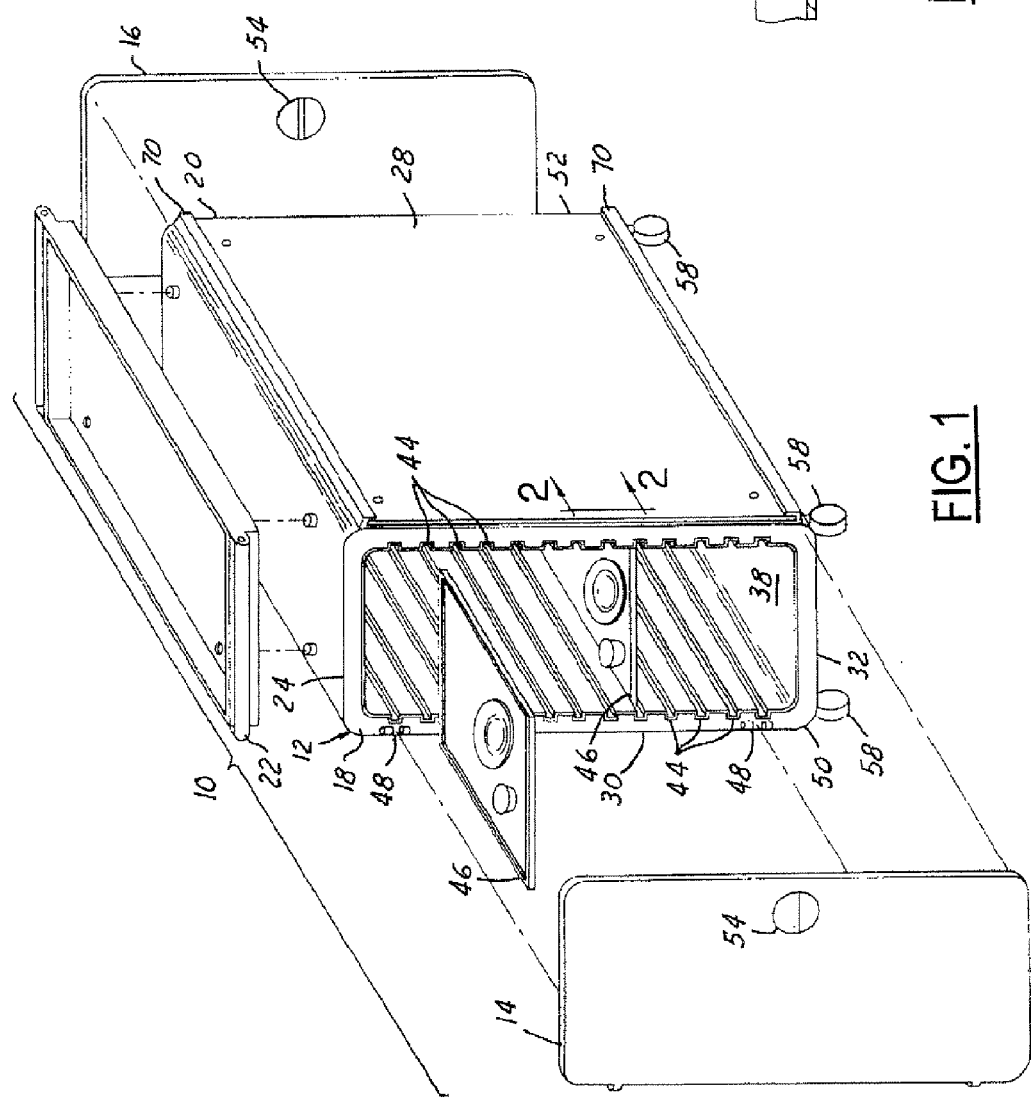

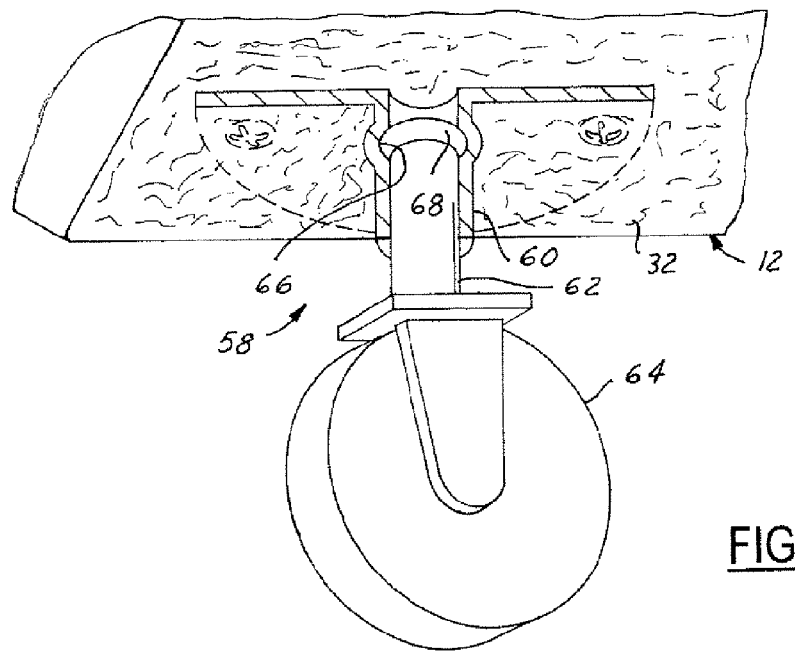
FIG. 3
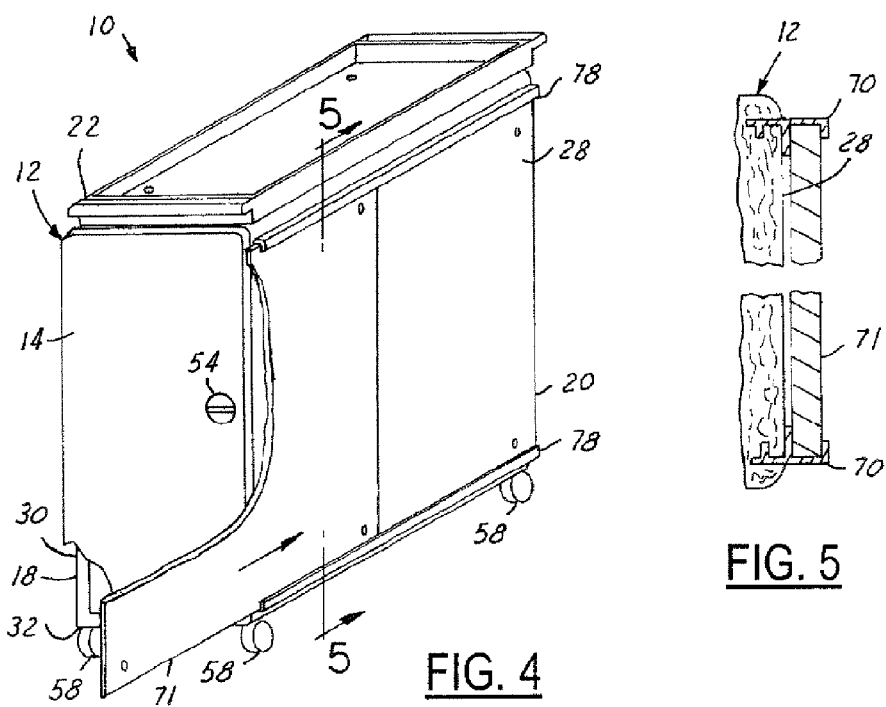
FIG. 4
FIG. 5

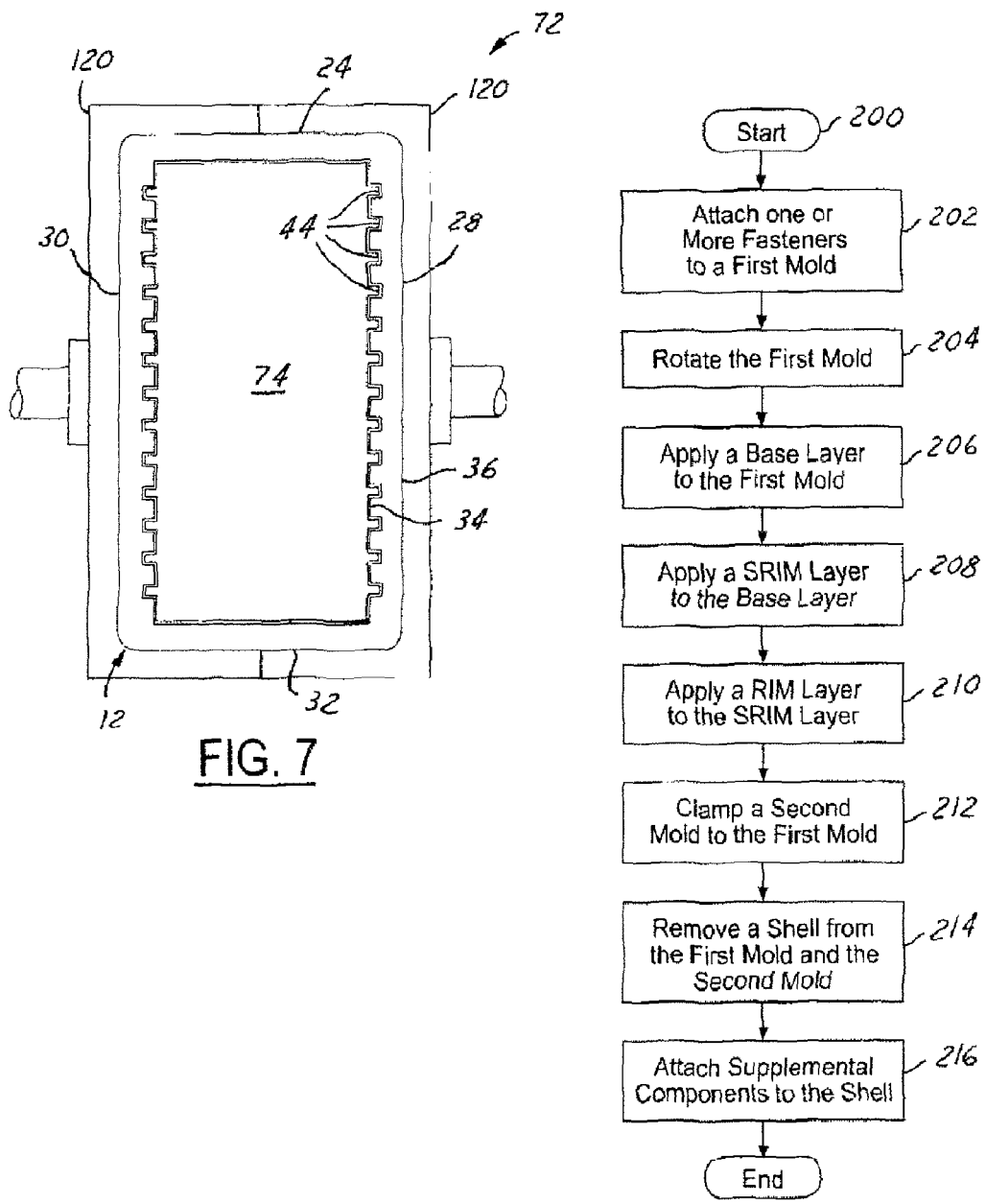

METHOD OF MANUFACTURE FOR REACTION-INJECTION-MOLDED CART

CROSS-REFERENCE TO RELATED APPLICATION

The present application is a divisional of and claims priority of U.S. application Ser. No. 10/813,765 (Applicant Disclosure No. 03-0074) filed on Sep. 16, 2004, entitled "REACTION-INJECTION-MOLDED CART AND METHOD OF MANUFACTURE" now abandoned. The present application is related to U.S. application Ser. No. 10/813/,765 (Applicant Disclosure No. 03-0074) entitled "AIRCRAFT GALLEY CARTS AND ASSOCIATED METHODS OF MANUFACTURE" now U.S. Pat. No. 7,544,915 B2,U.S. application Ser. No. 10/651,278 (Applicant Disclosure No. 02-1417) entitled "SIDEWALL PANEL INTEGRATED WITH INSULATION AND AIR DUCTS" now abandoned, and U.S. application Ser. No. 10/666,109 (Applicant Disclosure No. 02-1033), entitled "REACTION INJECTION MOLDED MEMBERS AND METHOD OF FORMING" now abandoned, the disclosures of which are incorporated by reference herein.

TECHNICAL FIELD

The present invention relates generally to galley carts for storing and serving food on aircrafts, and more particularly to a reaction-injection-molded cart having substantial thermal insulation and lightweight characteristics.

BACKGROUND OF THE INVENTION

Commercial airlines are well known for utilizing galley carts for transporting meals, maintaining those meals within a predetermined temperature range, and dispensing those meals to the passengers. Existing galley carts typically are manufactured by hand. The typical wall construction of a galley cart comprises a PVC or honeycomb core and an aluminum skin covering that core.

It would be desirable to provide a reaction-injection molded cart having improved thermal insulation characteristics and a substantially low manufacturing cycle time, as well as minimized costs associated therewith.

SUMMARY OF THE INVENTION

One embodiment of the present invention is a reaction-injection-molded galley cart ("RIM cart") for an aircraft. The RIM cart includes a body, which is configured to move along a passenger aisle of the aircraft. The body is comprised of a one-piece plastic shell having a first side portion, a second side portion spaced apart from the first side portion, a top side portion extending between the first side portion and the second side portion, and a bottom side portion extending between the first side portion and the second side portion. This one-piece plastic shell includes at least one layer of a reaction-injection-molded material.

One advantage of the invention is that a RIM cart is provided that has a simple construction with substantially few components for minimizing manufacturing cycle time, as well as costs associated therewith.

Another advantage of the invention is that a RIM cart is provided that has a substantially efficient construction for maintaining items within a predetermined temperature range.

Yet another advantage of the present invention is that a RIM cart is provided that has a substantially light-weight construction for increasing the available payload capacity of an aircraft.

Still another advantage of the present invention is that an automated method for manufacturing a galley cart is provided that utilizes computer-controlled mechanisms for improving manufacturing precision and consistently producing a uniform product quality.

The features, functions, and advantages can be achieved independently and in various embodiments of the present invention or may be combined in yet other embodiments.

BRIEF DESCRIPTION OF THE DRAWINGS

For a more complete understanding of this invention, reference should now be made to the embodiments illustrated in greater detail in the accompanying drawings and described below by way of examples of the invention:

FIG. 1 is an exploded view of a RIM cart for an aircraft, according to one advantageous embodiment of the claimed invention;

FIG. 2 is a partially cutaway cross-sectional view of the RIM cart shown in FIG. 1, as taken along line 2-2;

FIG. 3 is a perspective view of a castor coupled to a bottom side of the RIM cart shown in FIG. 1;

FIG. 4 is a perspective view of the RIM cart shown in FIG. 1, illustrating a decorative panel being attached to the galley cart;

FIG. 5 is a cross-sectional view of the RIM cart shown in FIG. 4, as taken along line 5-5;

FIG. 7 is a cross-sectional view of the system shown in FIG. 4, illustrating a second mold being clamped to a first mold for forming a one-piece plastic shell therebetween; and FIG. 8 is a logic flow diagram of a method for manufacturing the RIM cart shown in FIG. 1.

DETAILED DESCRIPTION OF THE INVENTION

Figure 6:
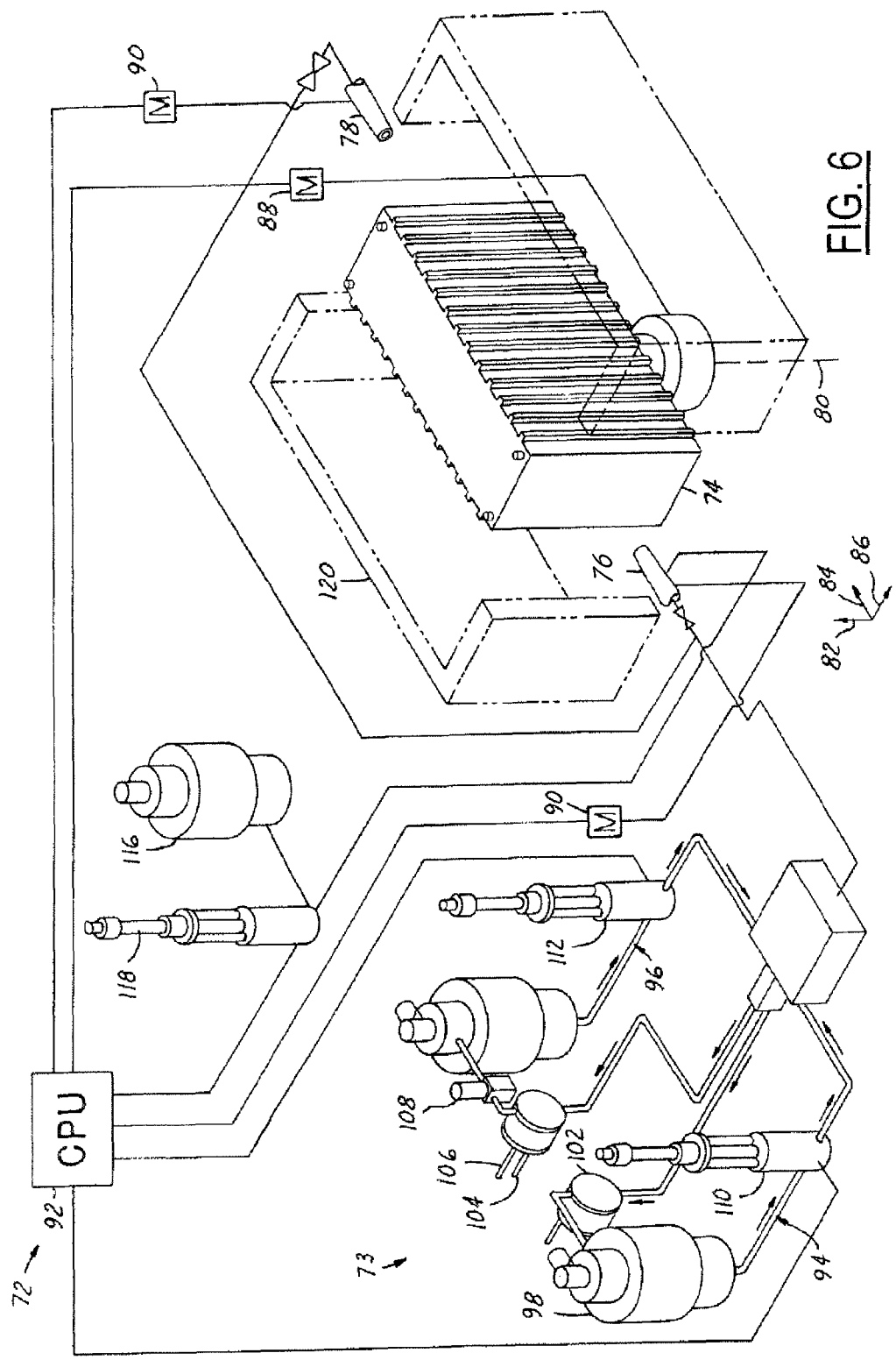
FIG. 6 is a perspective view of a system for manufacturing the RIM cart shown in FIG. 1.

In the following figures the same reference numerals are utilized for designating the same or similar components in the various views. Moreover, the illustrated embodiments described herein employ features where the context permits, e.g. when a specific result or advantage of the claimed invention is desired. Specifically, the embodiments described herein implement a reaction-injection-molded galley cart having a base layer and a foam layer with reinforcement fibers embedded therein. However, it is contemplated that the galley cart can include more or less layers and also lack the reinforcement fibers as desired. In this respect, it will be appreciated that various embodiments are contemplated having different combinations of the described features, having features other than those described herein, or lacking one or more of those features. For these reasons, it is understood that the invention can be carried out in various suitable modes.

Referring to FIG. 1, there is shown an exploded view of a reaction-injection-molded galley cart 10 ("RIM cart") for an aircraft, according to one advantageous embodiment of the claimed invention. The RIM cart 10 generally includes three primary components, namely a one-piece plastic shell 12, a pair of panels 14, 16 coupled to opposing sides 18, 20 of the shell 12, and a tray member 22 coupled to a top side portion 24 of the shell 12. However, it is contemplated that the RIM cart 10 can instead include more or less than three primary components as desired. For instance, the one-piece plastic shell 12 can instead be manufactured as a sub-assembly of two or more separate sub-components. Also, the tray member 22 can instead be an integral part of the shell 12 thereby decreasing the number of primary components to two. It will also be appreciated that the RIM cart 10 can include other suitable primary structures as desired.

In this embodiment, the one-piece plastic shell 12 has a cylindrical construction with a generally rectangular cross-section. However, it is understood that the one-piece plastic shell 12 can have a variety of other suitable constructions as desired. Specifically, in this embodiment, the one-piece plastic shell 12 includes a first side portion 28, a second side portion 30 that is spaced apart from the first side portion 28, a top side portion 24 extending between the first side portion 28 and the second side portion 30, and a bottom side portion 32 extending between the first side portion and the second side portion 30.

Moreover, as best shown in FIG. 2, the one-piece plastic shell 12 is comprised of a base layer 34 and a foam layer 36 coupled to the base layer 34. However, it is contemplated that more or less than the base layer 34 and the foam layer 36 can be utilized as desired.

The base layer 34 defines an interior of the RIM cart 10 and is comprised of a material that is generally impermeable to fluids. In this regard, the base layer 34 can be easily cleaned when food or beverages are spilled inside the RIM cart 10. In addition, the base layer 34 can also prevent beverages from leaking through the shell 12. Furthermore, this impermeable base layer 34 can prevent air from passing between the interior 38 of the RIM cart 10 and the exterior 40. This feature is beneficial for improving the thermal insulation properties of the shell 12. In this embodiment, the base layer 34 is comprised of high-density polyurethane. However, the base layer 34 can instead be comprised of various other suitable materials as desired. For example, it is contemplated that an outer layer of aluminum sheating or skin can be coupled to the foam layer 36.

Also in this embodiment, the foam layer 36 is a reaction-injection-molded material ("RIM material") that is coupled to the base layer 34. This foam layer 36 is substantially lightweight and has a substantially low coefficient of thermal conduction. In this way, the foam layer 36 provides a substantial heat transfer barrier for maintaining the interior 38 of the RIM cart 10 within a predetermined temperature range.

In addition, the foam layer 36 has a series of reinforcement members 42 embedded therein for strengthening the foam layer 36. These reinforcement members 42 are chopped carbon fibers. However, it is contemplated that the reinforcement members 42 can instead be continuously woven carbon fibers, chopped glass fibers, continuously woven glass fibers, various other suitable reinforcement structures and materials, or any suitable combination thereof.

The first side portion 28 and the second side portion 30 have a series of grooves 44 formed therein for receiving and supporting one or more food trays 46 within the interior 38 of the RIM cart 10.

Referring back to FIG. 1, the panels 14, 16 preferably are doors having two or more conventional hinge elements 48 and are coupled to the opposing ends 18, 20 of the shell 12. Each panel 14, 16 also has a door fastener 54 for selectively attaching to the one-piece plastic shell 12 and securing the door in the closed position. In this embodiment, the door fastener 54 is a conventional cam-latch device. However, it will be appreciated that various other suitable fasteners can be utilized as desired and also that only one of the panels 14, 16 can be a door instead of both.

Referring now to FIG. 3, the RIM cart 10 further includes four castors 58 coupled to the bottom side portion 32 of the one-piece plastic shell 12. However, it is understood that more or less than four castors 58 can be utilized as desired. Each castor 58 includes a sleeve portion 60 that is insert-molded, embedded within, or otherwise coupled to the bottom side portion 32 of the one-piece plastic shell 12. Each sleeve portion 60 is utilized for receiving a rod member 62 with a wheel 64 mounted thereon. In this way, the rod member 62 and the wheel 64 can swivel within the sleeve portion 60 for allowing the RIM cart 10 to be rolled in various directions. Moreover, each sleeve portion 60 has an annular groove 66 formed therein for receiving an annular flange 68 extending from the rod member 62. In this respect, the rod member 62 is rotatably coupled to the sleeve portion 60.

Referring now to FIGS. 4 and 5, the first side portion 28 further includes a pair of detent flanges 70 extending therefrom for mounting a decorative panel 71 to the one-piece plastic shell 12. However, it is understood that various other suitable fasteners can be utilized instead of the detent flanges 70. Also, it will be appreciated that the decorative panel 71 or other suitable structure can be mounted other portions of the RIM cart 10 as desired.

The pair of detent flanges 70 block upward and downward movement of the decorative panel 71. Additionally, as best shown in FIG. 4, the flanges 70 receive the decorative panel 71 in a direction along the length of the RIM cart 10. The decorative panel 71 is further secured to the first side portion 28 via four fasteners, e.g. threaded screws. However, it is understood that various other suitable fasteners can be utilized as desired. It Referring now to FIG. 6, there is shown a perspective view of a system 72 for manufacturing the RIM cart 10 shown in FIG. 1. This system 72 includes a first mold 74 and a base-resin applicator 76 for applying the base layer to the first mold 74. The system 72 further includes a foam-resin applicator 78 for applying one or more layers of RIM material to the base layer 34 on the first mold 74 so as to form the one-piece plastic shell 12. One skilled in the art will understand that having the base-resin applicator 76 and a separate foam-resin applicator 78 can prevent mixture of the base resin and the RIM material as desired. However, it is understood that the system 72 can omit the base-resin applicator 76 as desired and utilize only one application device to apply the two resins.

In this embodiment, the first mold 74 is rotatable about an axis 80. Also, the base-resin applicator 76 and the foam-resin applicator 78 are movable along one or more axes 82, 84, 86. The first mold 74 and the applicators 76, 78 are coupled to motors 88, 90 which are coupled to and controlled by a controller 92. In this way, the controller 92 can move the first mold 74, the base-resin applicator 76, and the foam-resin applicator 78 and also actuate the applicators 76, 78 to apply the RIM material onto the first mold 74. As a result, this feature allows the RIM material to be applied to the first mold 74 within a substantially short period of time so as to increase the production rates of shells 22 and decrease manufacturing costs associated therewith. This feature is also beneficial for maintaining the consistency in the structures of the manufactured shells 22. Further, the controller 92 can actuate the applicators 76,78 for applying additional resin to predetermined portions of the shell 12 for increasing the thickness and the strength of the shell 12 in those regions of the shell 12.

It will be appreciated that the first mold 74 can remain fixed in position while the applicators 76, 78 are moved around the first mold 74. Likewise, it is contemplated that the applicators 76, 78 can remain fixed in position while the first mold 74 rotates about its axis 80 and reciprocates along that axis 80. In this way, it is understood that less motors can be included as desired.

The system 72 further includes a RIM sub-system 73 for supplying the RIM material to the foam-resin applicator 78. In this embodiment, the RIM sub-system 73 generally includes two liquid supply lines, namely an isocyanate supply line 94 and a polyol supply line 96. Isocyanate and polyol are stored within their respective temperature-controlled feed tanks 98, 100. The isocyanate supply line 94 has a heat exchanger 102 integrated within. Also, the polyol supply line 96 has a water inlet 104, a water outlet 106, and a nucleator 108 integrated therein. It is understood that each supply line 94, 96 can contain various other conventional components as desired.

Each feed tank 98, 100 is coupled to its respective metering valve 110, 112 via the supply line 94, 96. The metering valve 110, 112 are coupled to the controller 92 and are operated by the controller 92 for regulating the pressure and the amount of isocyanate and polyol delivered to a mixing chamber within the foam-resin applicator 78. Thereafter, the RIM material is discharged from the foam-resin applicator 78 and applied to the first mold 74.

In this embodiment, the system 72 further includes a fiber supply tank 116 coupled to a regulator valve 118 for supplying chopped fibers 42 to the RIM material in the mixing chamber and producing structural reaction-injection-molded material ("SRIM material"). In this way, the foam-resin applicator 78 can apply resin with fiber reinforcements embedded therein. This feature is beneficial for providing substantial strength to the construction of the shell 12. However, it will be appreciated that the fiber supply tank 116 and the regulator valve 118 can be omitted from the system as desired.

As best shown in FIG. 7, the system 72 also includes a second mold 120 for clamping to the first mold 74. In this way, pressure and heat can be applied to the base layer 34 and the foam layer 36 for producing the one-piece plastic shell 12.

Referring now to FIG. 8, there is shown a logic flow diagram of a method for manufacturing the RIM cart shown in FIG. 1. This method commences in step 200 and them immediately commences to step 202.

In step 202, a series of fasteners are attached to the first mold 74. These fasteners can include the sleeve portions 60 of the castors 58, the hinge elements 48 for attaching the door panels 14, 16 to the shell 12, the detent flanges 70 for mounting the decorative panels 14, 16 to the side portions 28, 30, various other suitable fasteners embedded within the shell 12, or any combination thereof as desired. One skilled in the art will appreciate that these fasteners are only attached to the first mold 74 for the duration of the molding process. Then, the method proceeds to step 204.

In step 204, the controller 92 actuates the motor 88 and rotates the first mold 74 about its axis 80. However, as described hereinabove, it is contemplated that the controller 92 can instead actuate motors 90 for moving the applicators 76, 78 around a stationary first mold 74. It will be appreciated that the first mold 74, the base-resin applicator 76, the foam-resin applicator 78, or any combination thereof may be moved via a predetermined program or secured in a fixed position as desired. The sequence then proceeds to step 206.

In step 206, the controller 92 actuates the base-resin applicator 76 for applying the base layer 34 to the external surfaces of the first mold 74. As detailed hereinabove, this base layer 34 is utilized for defining the interior of the RIM cart 10 and is generally impermeable to fluids. However, it will be appreciated that step 206 can be omitted as desired. The sequence then proceeds to step 208.

In step 208, the controller 92 actuates the foam-resin applicator 78 and causes the foam-resin applicator 78 to apply a SRIM layer onto the base layer 34. Specifically, the controller 92 actuates the metering valve 110, 112 within the RIM subsystem 73 for delivering predetermined amounts of isocyanate and polyol to the mixing head of the base-resin applicator 76 at a predetermined pressure. In addition, the controller 92 actuates the regulator valve 118 for supplying a predetermined amount of reinforcement fibers 42 to the isocyanate and polyol within the mixing head. Thereafter, the mixture of the isocyanate, polyol, and fibers or SRIM material is applied to the first mold 74.

Also in this step, the controller 92 regulates the motors 88, 90 respectively coupled to the foam-resin applicator 78 and the first mold 74. In this way, the controller 92 can move the first mold 74 and the foam-resin applicator 78 for applying a predetermined amount of the RIM material to predetermined portions of the first mold 74. For that reason, it will be appreciated that the system 72 can also include position sensors (not shown). This feature is advantageous because the system 72 can produce a substantial number of carts consistently within substantially small tolerances. Additionally, the system 22 can provide larger wall thicknesses to predetermined portions of the shell 12 and increase the strength of those portions of the shell 12. Then, the sequence proceeds to step 210.

In step 210, the controller 92 actuates the foam-resin applicator 78 for applying RIM material to the onto the SRIM layer. Specifically, the controller 92 closes the regulator valve 118 and discontinues the supply of reinforcement fibers 42 to the mixing head. The controller 92 continues to actuate the RIM sub-system 73 for supplying isocyanate and polyol to the mixing head. Then, the mixture of isocyanate and polyol or the RIM material is applied onto the SRIM layer. In this regard, the reinforcement fibers 42 are substantially embedded within the foam layer 36 of RIM material. The controller 92 then actuates the foam-resin applicator 78 to stop applying the RIM material to the first mold 74. In this embodiment, the controller 92 closes the metering valve 110, 112 and actuates the motors 88, 90 to halt the rotation of the first mold 74 and the movement of the foam-resin applicator 78. Then, the sequence proceeds to step 212. Thereafter, the sequence proceeds to step 212.

In step 212, the second mold 120 is clamped to the first mold 74 for applying a predetermined amount of pressure and heat to the base layer 34 and the foam layer 36. This RIM process requires substantially low pressure and substantially low heat. These features are advantageous for increasing tool life, minimizing tool maintenance, and decreasing costs associated therewith. The sequence then proceeds to step 214.

In step 214, the one-piece plastic shell 12 is removed from the first mold 74 and the second mold 120 for trim and finish treatment. For example, in this step, any flashing, which resulted from a gap between the interface of the first mold 74 and the second mold 120, is removed. Then, the sequence proceeds to step 216.

In step 216, the tray member 22, the wheels 128, and the pair of panels 14, 16 are coupled to the one-piece plastic shell 12. Specifically, the pair of panels 14, 16 is coupled to their respective hinge elements 48, which are extending from the opposing ends 18, 20 of the shell 12. Additionally, the rod members 62 of the castors 58 are inserted into the sleeve portions 60 that are embedded within the bottom side portion 32 of the shell 12. Moreover, the decorative panels 14, 16 are attached to the first side portion 28 or the second side portion 30 of the shell 12 via the detent flanges 70.

While particular embodiments of the invention have been shown and described, numerous variations and alternate embodiments will occur to those skilled in the art. Accordingly, it is intended that the invention be limited only in terms of the appended claims.

What is claimed is:

1. A method for manufacturing a reaction-injection-molded galley cart for an aircraft, comprising:
    rotating a first mold;
    applying a base layer to said first mold;
    applying a foam layer to said base layer;
    halting a spin of said first mold;
    clamping a second mold to said first mold;
    applying pressure to said base layer and said foam layer; and heating said base layer and said foam layer;
    wherein said base layer and said foam layer form a one-piece plastic shell with a first side portion, a second side portion spaced apart from said first side portion, a top side portion extending between said first side portion and said second side portion, and a bottom side portion extending between said first side portion and said second side portion;
    wherein said foam layer comprises reaction-injection-molded material.

2. The method recited in claim 1 further comprising: applying an outer layer to said foam layer.

3. The method recited in claim 1 further comprising:
    securing at least one fastener to at least one of said first mold and said second mold; and
    embedding said at least one fastener in at least one of said base layer and said foam layer.

4. The method recited in claim 1 further comprising:
    coupling a tray member to said top side portion of said one-piece plastic shell.

5. The method recited in claim 1 further comprising:
    coupling a pair of panels to a pair of opposing ends of said one-piece plastic shell.

6. The method recited in claim 5 wherein at least one of said pair of panels is a door for selectively providing access to an interior cavity that is defined by said one-piece plastic shell.

7. The method recited in claim 1 further comprising:
    coupling a plurality of wheels to said bottom side portion of said one-piece plastic shell.

8. A method for manufacturing a reaction-injection-molded galley cart for an aircraft, comprising:
    rotating a first mold;
    applying a base layer to said first mold;
    applying a foam layer to said base layer;
    embedding a plurality of reinforcement members within at least one of said base layer and said foam layer;
    halting a spin of said first mold;
    clamping a second mold to said first mold;
    applying pressure to said base layer and said foam layer; and
    heating said base layer and said foam layer; and
    actuating a computer-controlled mechanism for moving at least one of said first mold, said second mold, and a resin applicator device;
    wherein said base layer and said foam layer form a one-piece plastic shell with a first side portion, a second side portion spaced apart from said first side portion, a top side portion extending between said first side portion and said second side portion, and a bottom side portion extending between said first side portion and said second side portion;
    wherein said foam layer comprises reaction-injection-molded material.

9. The method recited in claim 8 further comprising: applying an outer layer to said foam layer.

10. The method recited in claim 8 further comprising:
    securing at least one fastener to said first mold; and
    embedding said at least one fastener in at least one of said base layer and said foam layer.

11. The method recited in claim 8 further comprising:
    coupling a tray member to said top side portion of said one-piece plastic shell.

12. The method recited in claim 8 further comprising:
    coupling a pair of panels to a pair of opposing ends of said one-piece plastic shell.

13. The method recited in claim 12 wherein at least one of said pair of panels is a door for selectively providing access to an interior cavity that is defined by said one-piece plastic shell.

14. The method recited in claim 8 further comprising:
    coupling a plurality of wheels to said bottom side portion of said one-piece plastic shell.

* * * * *